(12) United States Patent
Watanabe et al.

(10) Patent No.: US 7,733,385 B2
(45) Date of Patent: Jun. 8, 2010

(54) IMAGE FILE GENERATING APPARATUS AND METHOD, AND IMAGE FILE REPRODUCING APPARATUS AND METHOD

(75) Inventors: Mikio Watanabe, Asaka (JP); Hisayoshi Tsubaki, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 1145 days.

(21) Appl. No.: 11/070,002

(22) Filed: Mar. 3, 2005

(65) Prior Publication Data

US 2005/0243187 A1 Nov. 3, 2005

(30) Foreign Application Priority Data

Mar. 5, 2004 (JP) ............................. 2004-061718

(51) Int. Cl.
*H04N 5/76* (2006.01)
(52) U.S. Cl. .................................. 348/231.2; 348/231.3
(58) Field of Classification Search .............. 348/231.2, 348/231.3
See application file for complete search history.

(56) References Cited

U.S. PATENT DOCUMENTS

| 6,282,311 | B1 | 8/2001 | McCarthy et al. | |
|---|---|---|---|---|
| 7,277,121 | B2 * | 10/2007 | Mashitani et al. | ............. 348/51 |
| 2005/0141848 | A1 * | 6/2005 | Deguchi et al. | ................ 386/1 |
| 2005/0200725 | A1 * | 9/2005 | Masumoto et al. | ....... 348/231.2 |
| 2005/0248561 | A1 * | 11/2005 | Ito et al. | ..................... 345/419 |

FOREIGN PATENT DOCUMENTS

| JP | 6-38172 | 2/1994 |
|---|---|---|
| JP | 2001-86462 | 3/2001 |
| JP | 2001-352515 | 12/2001 |
| JP | 2004-274091 | 9/2004 |
| JP | 2005-109648 | 4/2005 |
| JP | 2005-245019 | 9/2005 |
| WO | WO 03084223 | * 10/2003 |
| WO | WO03092303 | * 11/2003 |

OTHER PUBLICATIONS

Japanese Office Action dated May 27, 2008, with English translation.

* cited by examiner

*Primary Examiner*—David L Ometz
*Assistant Examiner*—Dillon Durnford-Geszvain
(74) *Attorney, Agent, or Firm*—McGinn IP Law Group, PLLC

(57) ABSTRACT

First and second data areas are defined in an image file, and each area is defined to have an image data recording area and a header data recording area. When the image file is reproduced, header data in a first header data recording area at the leading end is read and first image data that has been recorded in the first image data recording area is reproduced. If an image file reproducing apparatus is one that can reproduce second image data that has been recorded in the second data area, then the second image data is read from the second area and reproduced. The first image data is data that has undergone JPEG compression, and the second image data is data that has not been compressed. Since the compressed first image data and uncompressed second image data can be stored in one file, an increase in number of files can be reduced even if there is an increase in types of image format.

9 Claims, 11 Drawing Sheets

*Fig. 6*
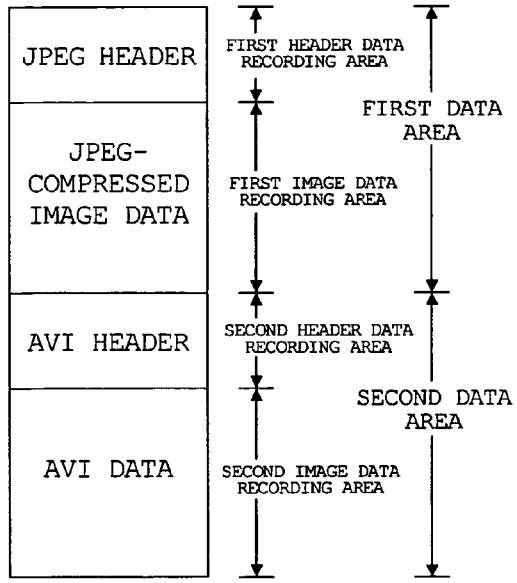
MOV_ABCD_0004.JPG
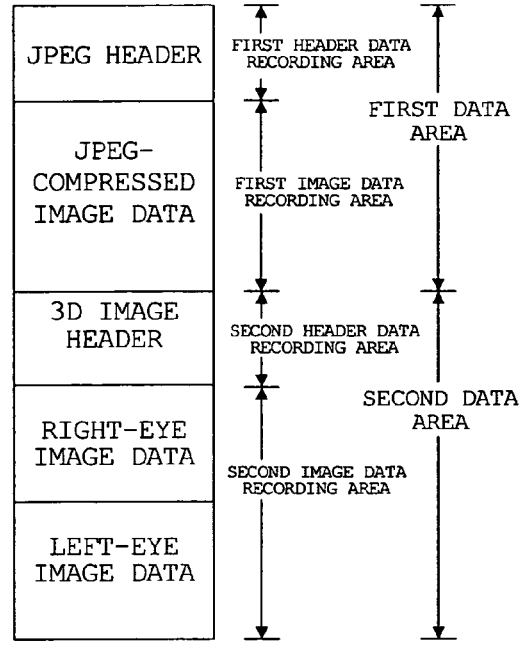
3DI_ABCD_0005.JPG
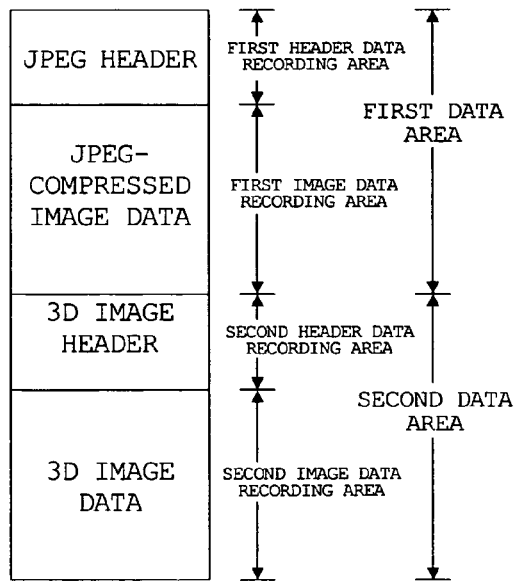
3DI_ABCD_0006.JPG
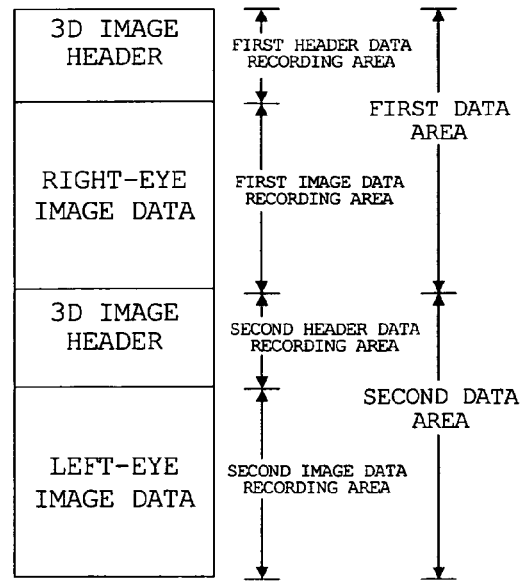
3DI_ABCD_0007.JPG

IMAGE FILE GENERATING APPARATUS AND METHOD, AND IMAGE FILE REPRODUCING APPARATUS AND METHOD

BACKGROUND OF THE INVENTION

1. Field of the Invention

This invention relates to an apparatus and method for generating image files, and to an apparatus and method for reproducing image files.

2. Description of the Related Art

In a digital still camera, an image file storing image data representing the image of a subject is generated by sensing the image of the subject, and the image file is recorded on a memory card. Image data that is placed in an image file can have a very wide variety of formats. However, if image data placed in an image file is data that represents a still picture, it can be of only one type having a certain specific format. For example, if either a compression mode or a non-compression mode is designated and the designated mode is the compression mode, a JPEG file is formed and recorded on the memory card. If the designated mode is the non-compression mode, then a TIFF file is formed and recorded on the memory card (see the specification of Japanese Patent Application Laid-Open No. 2001-352515).

Further, in order to so arrange it that image data that has been recorded in different color spaces can be reproduced, there is a technique that records image data representing one image in one color space as well as data indicating the difference between this image data and image data in the other color space different from the first-mentioned color space (see the specification of U.S. Pat. No. 6,282,311B1).

In order to obtain the difference, however, a requirement is agreement between the basic specifications of the images, such as the numbers of pixels constituting the images in the different color spaces. An image for which the number of pixels differs cannot be obtained.

Further, since the format of image data corresponds to each particular image file, a new image file is generated in a case where image data having a different format is recorded on the memory card. Thus, the number of image files also increases in conformity with the types of format.

DISCLOSURE OF THE INVENTION

An object of the present invention is to make it possible to record image data having a number of formats without increasing the number of image files.

Another object of the present invention is to make it possible to reproduce image data thus recorded.

A further object of the present invention is to obtain two types of image data having different basic specifications from a single image file.

According to a first aspect of the present invention, the foregoing objects are attained by providing an image file generating apparatus comprising: first header generating means for generating first header data regarding first image data applied thereto; first header data appending means for appending first header data, which has been generated by the first header data generating means, to the beginning of the first image data; second header generating means for generating second header data regarding second image data applied thereto; second header data appending means for appending second header data, which has been generated by the second header data generating means, to the beginning of the second image data; third header data appending means for appending the second header data to follow the first image data; image file writing means for writing the first image data, to which the first header data has been appended by the first header data appending means, and the second image data, to which the second header data has been appended by the second header data appending means, to a recording medium in such a manner that one image file is generated from the first image data and the second image data; and extension recording control means for recording data, which represents an extension decided based upon the first image data, on the recording medium as data representing an extension of the image file.

The first aspect of the present invention also provides a method suited to the above-described image file generating apparatus. Specifically, the method comprises the steps of: generating first header data regarding first image data applied; appending generated first header data to the beginning of the first image data; generating second header data regarding second image data applied; appending generated second header data to the beginning of the second image data; appending the second header data to follow the first image data; writing the first image data, to which the first header data has been appended, and the second image data, to which the second header data has been appended, to a recording medium in such a manner that one image file is generated from the first image data and the second image data; and recording data, which represents an extension decided based upon the first image data, on the recording medium as data representing an extension of the image file.

In accordance with the first aspect of the present invention, first header data regarding applied first image data is generated, and the generated first header data is appended to the beginning of the first image data. In the prior art, header data is thus appended to the beginning of image data to thereby generate one image file. In accordance with the present invention, second header data regarding applied second image data is further generated and is appended to the beginning of the second image data. The second header data is appended to follow the first image data. Thus, a series of image data is generated in the following order: the first header data, then the first image data, then the second header data and then the second image data. The data is written to a recording medium in such a manner that a single image file is generated from the image data thus generated. Data representing an extension decided based upon the first image data is recorded on the recording medium as data representing the extension of the image file.

In accordance with the first aspect of the present invention, two types of image data (which may be of the same or different formats) to which respective ones of header data have been appended are placed in one image file. This makes it possible to record image data having many types of formats without increasing the number of image files. Since the extension of the image file is decided based upon the first image data, the image file can be handled in the same manner as a conventional image file on the grounds that it contains the first image data. For example, in a conventional apparatus that cannot reproduce an image file of the kind containing two types of image data each having header data appended thereto, only the first image data can be reproduced based upon the extension.

The first image data preferably is image data based upon the JPEG (Joint Photographic Experts Group) standard (the image data is generated by JPEG image data generating means). JPEG-based image data has actually been standardized and can be reproduced by many types of image reproducing apparatus. Accordingly, even when the conventional apparatus is one that cannot reproduce an image file of the kind containing two types of image data each having header data appended thereto, if the first image data is based upon the JPEG standard, then the apparatus will be able to reproduce the image represented by the first image data.

The second image data is at least one item of image data from among image data that has been compressed according to a compression scheme other than JPEG (the image may be moving or still, and the data is generated by compressed-image data generating means), uncompressed image data (data the quantity of which is greater than or less than the quantity of the first image data), and image data representing a 3D image (generated by 3D-image data generating means).

The first image data is one of the two items of image data that constitute a 3D image, and the second image data is the other of the two items of image data. In case of a reproducing apparatus capable of reproducing the first image data and the second image data, a 3D image can be displayed using these two items of image data. Further, even if the apparatus cannot reproduce the second image data, it can display the image represented by the first image data.

By way of example, the first image data is data that represents a reduced image of the second image represented by the second image data (the reduced image data is generated by reduced-image data generating means). The size of the reduced image can be decided at will.

The first header data appending means appends at least one of the following items of data to the first image data: data indicating an address of the second header data in the image file, recording identification data indicating whether or not the second image data has been recorded in the image file, and image-type identification data indicating whether the image represented by the second image data is a moving picture or a still picture. The features of the image represented by the second image data can be ascertained by recognizing the content recorded as the first header data.

The apparatus may further comprise electronic watermark means for embedding, as an electronic watermark in the first image data, at least one of the recording identification data indicating whether or not the second image data has been recorded in the image file and the image-type identification data indicating whether the image represented by the second image data is a moving picture or a still picture. In this case, the first header data appending means would append the first header data to the first image data in which the electronic watermark has been embedded by the electronic watermark means.

By reproducing an image file in a reproducing apparatus that is capable of reading an electronic watermark, the fact that the second image data is contained in this image file can be ascertained.

The apparatus may further comprise first file-name generating means for generating a file name of the image file; identification code generating means for generating an identification code representing a feature of the second image data; identification code appending means for appending the identification code, which has been generated by the identification code generating means, to the file name that has been generated by the first file-name generating means; and file-name recording control means for recording file-name data, which represents the file name to which the identification code has been appended by the identification code appending means, on the recording medium as data representing the file name of the image file.

Since the file name includes an identification code representing the feature of the second image data, the existence and feature of the second image data can be ascertained by checking the file name.

According to a second aspect of the present invention, the foregoing objects are attained by providing an image file reproducing apparatus comprising first reading means for reading first image data, first header data and extension data from a recording medium on which have been recorded one image file and the extension data, which corresponds to the first image data and serves as data representing an extension of the image file, wherein the image file includes a first recording area and a second recording area, which have been specified in such a manner that the second recording area follows the first recording area, each having a header recording area and an image data recording area, respectively, the first header data is recorded in the header recording area of the first recording area, the first image data is recorded in the image data recording area of the first recording area, second header data is recorded in the header recording area of the second recording area and second image data is recorded in the image data recording area of the second recording area; first reproducing means for reproducing the first image data, which has been read by the first reading means, based upon the first header data and the read extension data; first display control means for controlling a display unit so as to display a first image represented by the first image data reproduced by the first reproducing means; determination means for determining whether the second header data and the second image data have been recorded in the header recording area and image data recording area, respectively, of the second recording area; second reading means, responsive to a determination by the determination means that the second header data and the second image data have been recorded in the header recording area and image data recording area, respectively, of the second recording area, for reading the second header data that has been recorded in the header recording area of the second recording area and the second image data that has been recorded in the image data recording area of the second recording area; second reproducing means for reproducing the second image data, which has been read by the second reading means, based upon the second header data; and second display control means for controlling the display unit so as to display the second image represented by the second image data reproduced by the second reproducing means.

The second aspect of the present invention also provides a method suited to the above-described image file reproducing apparatus. Specifically, the method comprises the steps of: reading first image data, first header data and extension data from a recording medium on which have been recorded one image file and the extension data, which corresponds to the first image data and serves as data representing an extension of the image file, wherein the image file includes a first recording area and a second recording area, which have been specified in such a manner that the second recording area follows the first recording area, each having a header recording area and an image data recording area, respectively, the first header data is recorded in the header recording area of the first recording area, the first image data is recorded in the image data recording area of the first recording area, second header data is recorded in the header recording area of the second recording area and second image data is recorded in the image data recording area of the second recording area; reproducing the read first image data based upon the first header data and the read extension data; displaying a first image, which is represented by the first image data reproduced, on a display unit; determining whether the second header data and the second image data have been recorded in the header recording area and image data recording area, respectively, of the second recording area; in response to a determination that the second header data and the second image data have been recorded in the header recording area and image data recording area, respectively, of the second recording area, reading the second header data that has been recorded in the header recording area of the second recording area and the second image data that have been recorded in image data recording area of the second recording area; reproducing the read second image data based upon the second header data; and displaying a second image, which is represented by the second image data reproduced, on the display unit.

The second aspect of the present invention provides an apparatus for reproducing an image file that has been written to a recording medium based upon the first aspect of the present invention.

In accordance with the second aspect of the present invention, first image data, first header data and extension data are read from an image file. The first image data is reproduced based upon the first header data and the extension data. Further, it is determined whether second header data and second image data have been recorded, and the second header data and second image data are read if it is determined that these data have been recorded. The read second image data is reproduced based upon the second header data. Even in a case where first image data and second image data each having a header area have been recorded in one image file, both the first image data and the second image data can be reproduced.

The reproducing apparatus may further comprise designating means for designating an extension of an image file to be reproduced. In this case, the first reading means would read the first image data that has been recorded in the first image data recording area of the image file having the extension designated by the designating means.

Data indicating that the second image data has been recorded in the second recording area may be recorded in the first image data. Thus the user can ascertain the fact that second image data and not just first image data has been recorded in an image file. In a case where an apparatus that is incapable of reproducing the second image data is used for playback, the second image data can be reproduced by an apparatus that is capable of reproducing the second image data by allowing the user to ascertain that the second image data has been recorded.

Data indicating that the second image data has been recorded in the second recording area may be embedded in the first image data by an electronic watermark. In this case, the reproducing apparatus would further comprise: electronic watermark reproducing means for reproducing the electronic watermark data that has been embedded; and third display control means for controlling the display unit so as to display second-image existence information represented by the electronic watermark data reproduced by the electronic watermark reproducing means.

The existence of second image data is ascertained by reproducing the electronic watermark.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6(A) to (D) illustrate the file structures of other image files.

DESCRIPTION OF THE PREFERRED EMBODIMENT

A preferred embodiment of the present invention will now be described in detail with reference to the accompanying drawings.

Figure 1:
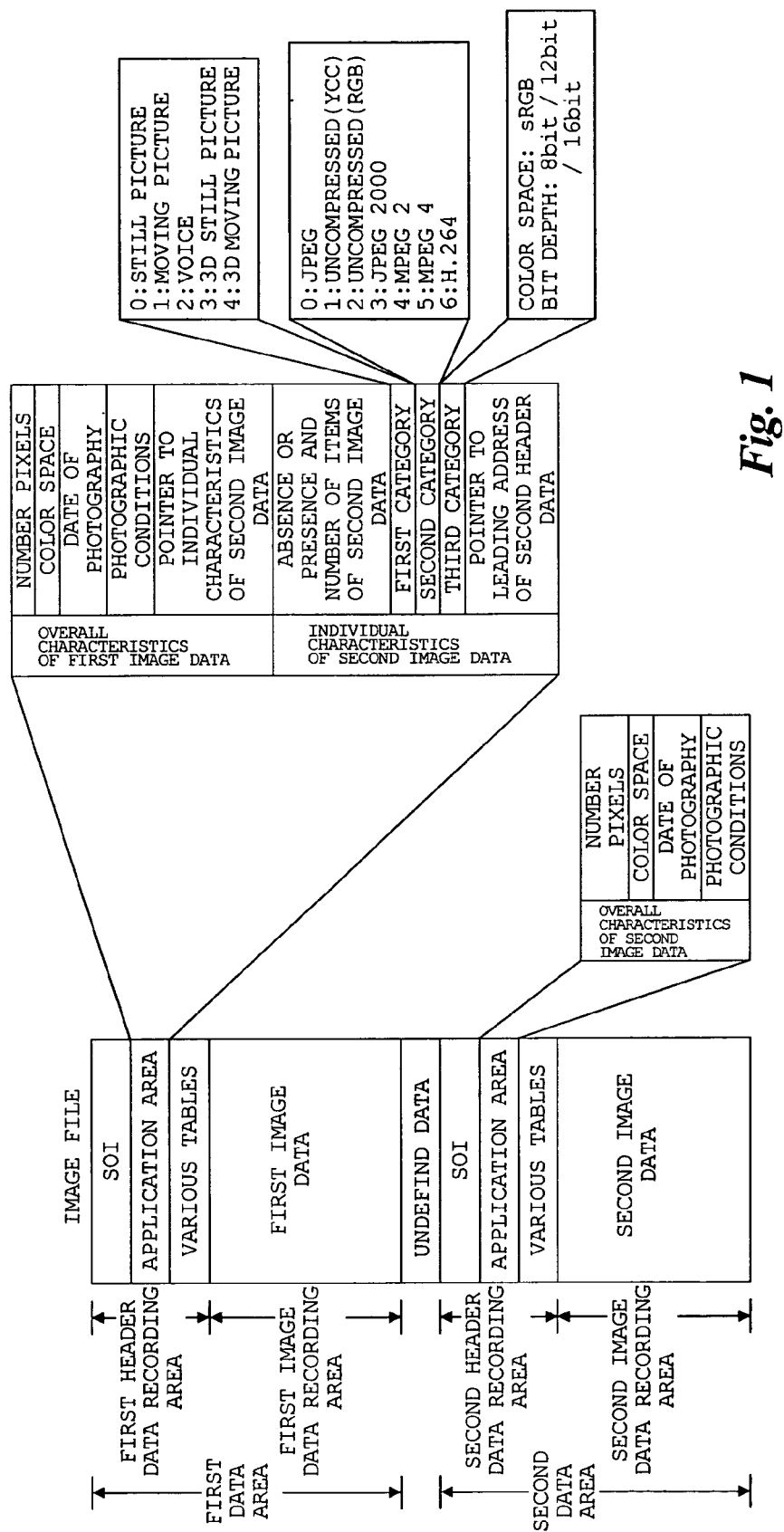
FIG. 1 illustrates the file structure of an image file.

FIG. 1 illustrates the file structure (data structure) of an image file generated by an embodiment of the present invention.

An image file generated by this embodiment includes a first data recording area formed at the beginning of the image file, an undefined-data recording area formed to follow the first data recording area, and a second data recording area formed to follow the undefined-data recording area. The first data recording area has a first header data recording area formed at the beginning thereof, and a first image data recording area formed to follow the first header data recording area. The second data recording area has a second header data recording area formed at the beginning thereof, and a second image data recording area formed to follow the second header data recording area. Thus, in the image file according to this embodiment, the image file does not contain one header data recording area and one image data recording area as in the prior art but instead contains two header data recording areas and two image data recording areas. It is just as if one image file contains two image files.

Start of image (SOI) is stored using the area at the beginning of the first header data recording area. The first header data storage area has an application area formed to follow the area in which the SOI is stored, and an area, which is for storing various tables, formed at the end. The SOI is data indicating the start of the first data area. Information, such as information regarding the first image data that has been recorded in the first image data recording area, is stored in the application area, as will be described later in greater detail. The various tables include a quantization table and Huffman encoding table, etc., used in image data compression processing. The first image data corresponding to the header data that has been recorded in the first header data recording area is recorded in the first image data recording area.

Any data may be stored in the undefined-data recording area, and the undefined-data recording area itself may not exist.

In a manner similar to that of the first header data recording area, the second header data recording area also has an SOI stored at the beginning of this area, and an application area and an area containing various tables are formed to follow this area. Second image data corresponding to various data that has been recorded in the second header data recording area is contained in the second image data recording area.

The application area included in the first header data recording area contains first image data overall characteristics regarding the first image data recorded in the first image data recording area and second image data individual characteristics regarding the second image data recorded in the second image data recording area. The overall characteristics of the first image data mainly are characteristics relating to the photographic circumstances that prevailed when the first image data was obtained. The overall characteristics of the first image data include the number of pixels of the image represented by the first image data, the color space, date of photography, photographic conditions and a pointer to the individual characteristics of the second image data. The individual characteristics of the second image data mainly are characteristics obtained from the second image data obtained by photography. The individual characteristics of the second image data include an indication as to whether second image data exists or not, number of items of second image data, a first category, second category, third category and a pointer to the leading address of the second header data. The first category has data indicating whether what is represented by the second image data is a still picture (in which case 0 is stored here), a moving picture (1 is stored), voice (it is assumed for the sake of convenience that voice is included) (2 is stored here), a 3D still picture (3 is stored here), or a 3D moving picture (4 is stored here). The second category has data indicating whether or not compression has been applied and, if so, the type of compression, such as data indicating whether the second image data has been compressed based upon the JPEG scheme (in which case 0 is stored here), whether the second image data is uncompressed luminance color-difference data (1 is stored here) or uncompressed RGB data (CCD raw data) (2 is stored here), or whether the second image data has been compressed based upon the JPEG2000 scheme (3 is stored here), etc. The third category includes the color space of the second image data and the number of bits (bit depth) representing each pixel of the second image represented by the second image data.

In a manner similar to that of the overall characteristics of the first image data, data such as the number of pixels and color space is contained in the application area included in the second header data storage area. The application area does not, however, contain a pointer to the individual characteristics of the second image data.

In FIG. 1, two data areas, namely the first data area and the second data area, are defined in the image file. However, three or more data areas rather than two data areas may be defined in the image file. In a case where three or more image areas have been defined in one image file, individual characteristics of third image data are stored in the application area of the first header data recording area, and a pointer to the individual characteristics of the third image data also is stored in the application area.

When the first data area (and undefined-data area) is considered, the first header data recording area is defined at the leading end and the first image data recording area is defined to follow the first header data recording area in a manner similar to that of the so-called conventional image file. As a result, the first image data contained in the image file shown in FIG. 1 can be reproduced using a conventional image file reproducing apparatus.

Figure 2:
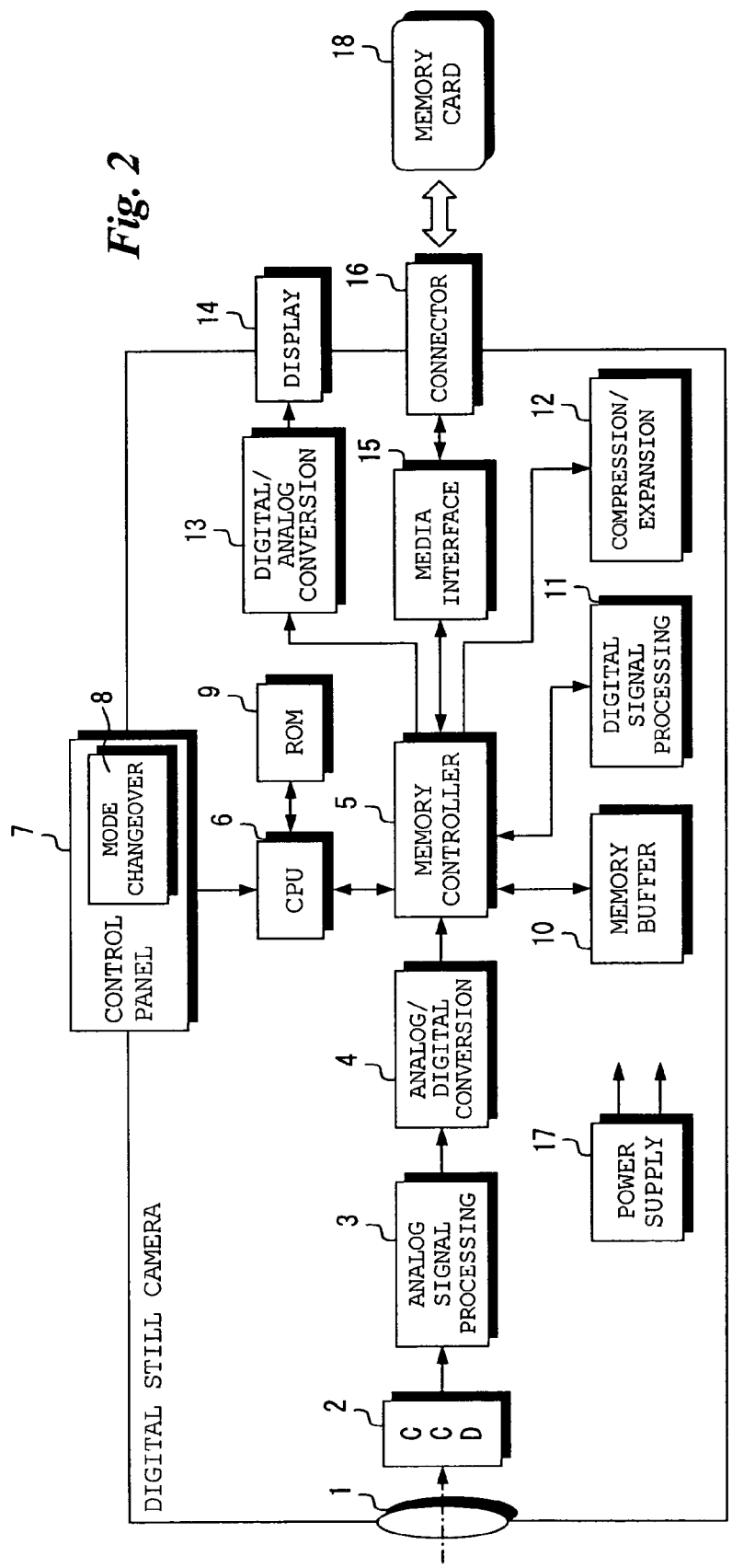
FIG. 2 is a block diagram illustrating the electrical structure of a digital still camera.

FIG. 2 is a block diagram illustrating the electrical structure of a digital still camera (image file generating apparatus) capable of generating the image file shown in FIG. 1.

The overall operation of the digital still camera is controlled by a CPU 6. The digital still camera is provided with a control panel 7 that includes a power-supply button and a shutter-release button (a button of the two-stroke-type is used), etc. The control panel 7 also includes a mode changeover dial 8. The latter is for setting or changing over a recording mode (still-picture recording mode, moving-picture recording mode, voice recording mode, 3D still-picture recording mode or 3D moving-picture recording mode), a playback mode and a set-up mode for setting up the camera. Compression/non-compression modes (the modes is set in the set-up mode) include a JPEG compression mode, a luminance color-difference data non-compression mode and a CCD RAW mode. A control signal from the control panel 7 is input to the CPU 6.

A ROM 9 is connected to the CPU 6. An operation program and various data for generating the above-described header data are stored in the ROM 9. The digital still camera further includes a power supply circuit 17 from which power is supplied to the various circuits.

It will be assumed that the still-picture recording mode has been set by the mode changeover dial 8. When this mode has been set, the image of the subject is formed on the photoreceptor surface of a CCD 2 by a zoom lens 1. The CCD 2, which has about 6,000,000 pixels, outputs a video signal representing the image of the subject. This signal is input to an analog signal processing circuit 3, which subjects the signal to prescribed analog signal processing such as a gamma correction and white balance adjustment. The video signal that is output from analog signal processing circuit 3 is converted to digital image data by an analog/digital converting circuit 4. The digital image data is applied to and stored temporarily in a memory buffer 10 by a memory controller 5. The image data that has been stored in the memory buffer 10 is read and, in accordance with the setting of the set-up mode, processing for generating luminance data and color difference data is executed by applying the read data to a digital signal processing circuit 11, or compression processing is executed by applying the read data to a compression/expansion circuit 12. Luminance data and color difference data that has been generated by the digital signal processing circuit 11 and compressed image data that has been generated by the compression/expansion circuit 12 are applied to and stored temporarily in the memory buffer 10. The memory buffer 10 does not overwrite data but stores applied data successively in new areas.

Image data that has been read out of the memory buffer 10 is applied to a digital/analog converting circuit 13, where the signal is converted to an analog video signal. The analog video signal obtained by the conversion is applied to a display unit 14, whereby the image of the subject captured is displayed on the display screen of the display unit.

If the shutter-release button is pressed through the first stage of its stroke, the image data that is output from the analog/digital converting circuit 4 is applied to the CPU 6 by the memory controller 5, as mentioned above. On the basis of the entered image data, the CPU 6 executes automatic exposure control by controlling the shutter time of the CCD 2 (by controlling an electronic shutter), and autofocus control by adjusting the lens position of the zoom lens 1.

If the shutter-release button is pressed through the second stage of its stroke, the image data that has been stored in the memory buffer 10 is read as described above, header data is appended and the resultant data is written as an image file to a memory card 18 connected to a connector 16 via a media interface 15. The write operation will be described later in detail. It goes without saying that the image data recorded on the memory card 18 will or will not be subjected to compression and, if compressed, that the compression method will differ, depending upon the mode to which the digital still camera has been set, namely the JPEG compression mode, luminance color-difference data non-compression mode or CCD RAW mode, etc.

Figure 3:
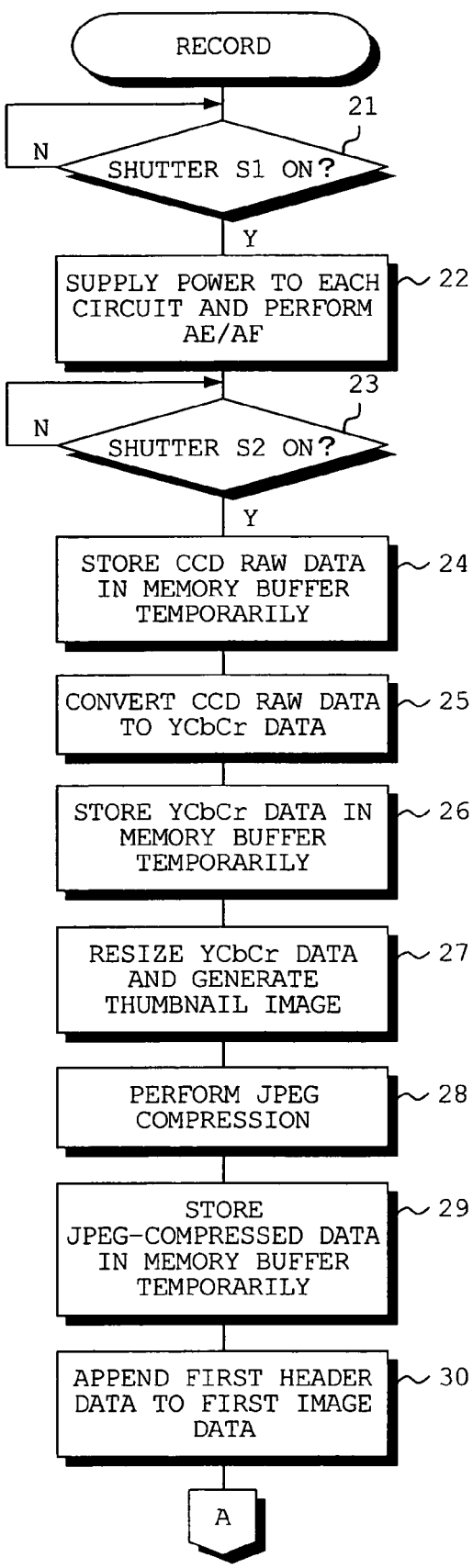
FIG. 3 is a flowchart illustrating processing for recording a still picture.
Figure 4:
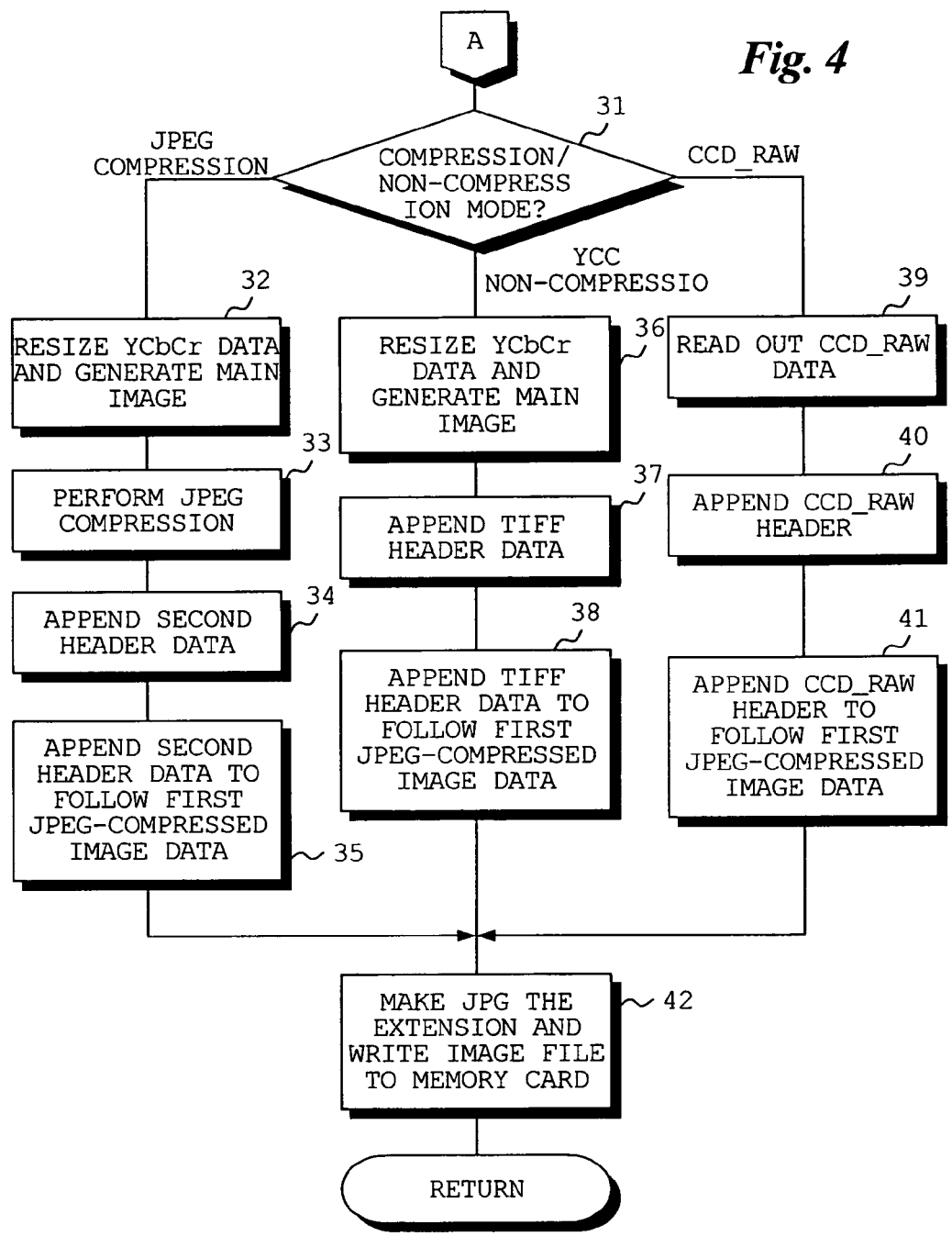
FIG. 4 is a flowchart illustrating processing for recording a still picture.

FIGS. 3 and 4 are flowcharts illustrating the processing of the still-picture recording mode in the digital still camera.

According to this processing, first image data and second image data are generated, header data is appended to each of these items of data and the resultant data is placed in a single image file and recorded on the memory card 18. JPEG-compressed thumbnail image data is placed in the image file as the first image data and, depending upon the setting of the digital still camera, JPEG-compressed image data, uncompressed luminance data and color difference data, or CCD RAW data is placed in the image file as the second image data.

If the power-supply button is pressed, power is supplied to the necessary circuits, such as the CCD 2, among the circuits that constitute the digital still camera, and the remaining circuits are placed in a standby mode. If the still-picture recording mode is set by the mode changeover dial 8 and the shutter-release button is pressed through the first stage of its stroke ("YES" at step 21), then power is supplied to each circuit the circuits in the standby mode. Further, automatic exposure control (AE) and autofocus control (AF) is carried out, in the manner described above, based upon the image data that has been output from the analog/digital converting circuit 4 (step 22). The image of a subject is displayed on the display screen of the display unit 14 by sensing the image of the subject. If the camera angle has been decided, then the shutter-release switch is pressed through the second stage of its stroke.

If the shutter-release switch is pressed through the second stage of its stroke ("YES" at step 23), then the image data that has been output from the analog/digital converting circuit 4 is applied to and stored temporarily in the memory buffer 10, as described above (temporary storage of CCD RAW data; step 24). The CCD RAW data is read from the memory buffer 10 and applied to the digital signal processing circuit 11 under the control of the memory controller 5. Luminance data and color difference data (YCbCr data) is generated from the CCD RAW data by the digital signal processing circuit 11 (step 25). The YCbCr data generated is applied to the memory buffer 10, whereby this data is stored temporarily (step 26).

The YCbCr data that has been recorded in the memory buffer 10 is read by the memory controller 5 while it is being downsampled. This downsampling and read-out is image resizing processing, and thumbnail image data having 640 pixels horizontally and 480 pixels vertically is generated (step 27). The thumbnail image data is applied to the compression/expansion circuit 12 successively by the memory controller 5 and is subjected to JPEG compression (step 28). The JPEG-compressed thumbnail image data is applied to and stored temporarily in the memory buffer 10 (step 29). Since the memory buffer 10 is controlled by the memory controller 5 so as not to overwrite data, the CCD RAW data, YCbCr data and JPEG-compressed thumbnail image data (first image data) are stored in the memory buffer 10.

Data for generating the first header data is read from the ROM 9. Header data such as the number of pixels is written additionally by the CPU 6, whereby the first header data is generated, and the first header data is appended to the leading end of the first image data that has been stored in the memory buffer 10 (step 30). It goes without saying that data (see FIG. 1) regarding the individual characteristics of the second image data also is written to the first header data in accordance with the set-up of the digital still camera.

This is followed by processing regarding the second image data appended to follow the first image data. Processing changes depending upon whether the compression mode that has been set in the set-up mode is JPEG compression, YCC non-compression or CCD RAW. Of course, it goes without saying that if JPEG2000 has been set, then processing conforming to this setting is executed.

In a case where JPEG compression has been set as the compression/non-compression mode of the digital still camera (step 31), YCbCr data on the order of 6,000,000 pixels that has been stored in the memory buffer 10 is read out while being downsampled and YCbCr data representing the main image composed of approximately 3,000,000 pixels is generated (step 32). The YCbCr data is applied successively to and compressed by the compression/expansion circuit 12 (step 33). The JPEG-compressed YCbCr data (second image data) is applied to and stored temporarily in the memory buffer 10.

Data for generating the second header data (JPEG header data) is read from the ROM 9. Header data such as the number of pixels is written additionally by the CPU 6, whereby the second header data is generated, and the second header data is appended to the leading end of the second image data that has been stored in the memory buffer 10 (step 34).

The main image data (second image data) having the second header data appended to its leading end is appended to follow the thumbnail image data (first image data) having the first header data appended to its leading end (step 35), and the resultant data is written to the memory card 18 as one image file. An extension constituting the file name of the image file uses the extension (JPG) that corresponds to the first image data and is recorded on the memory card 18 (step 42).

Figure 5:
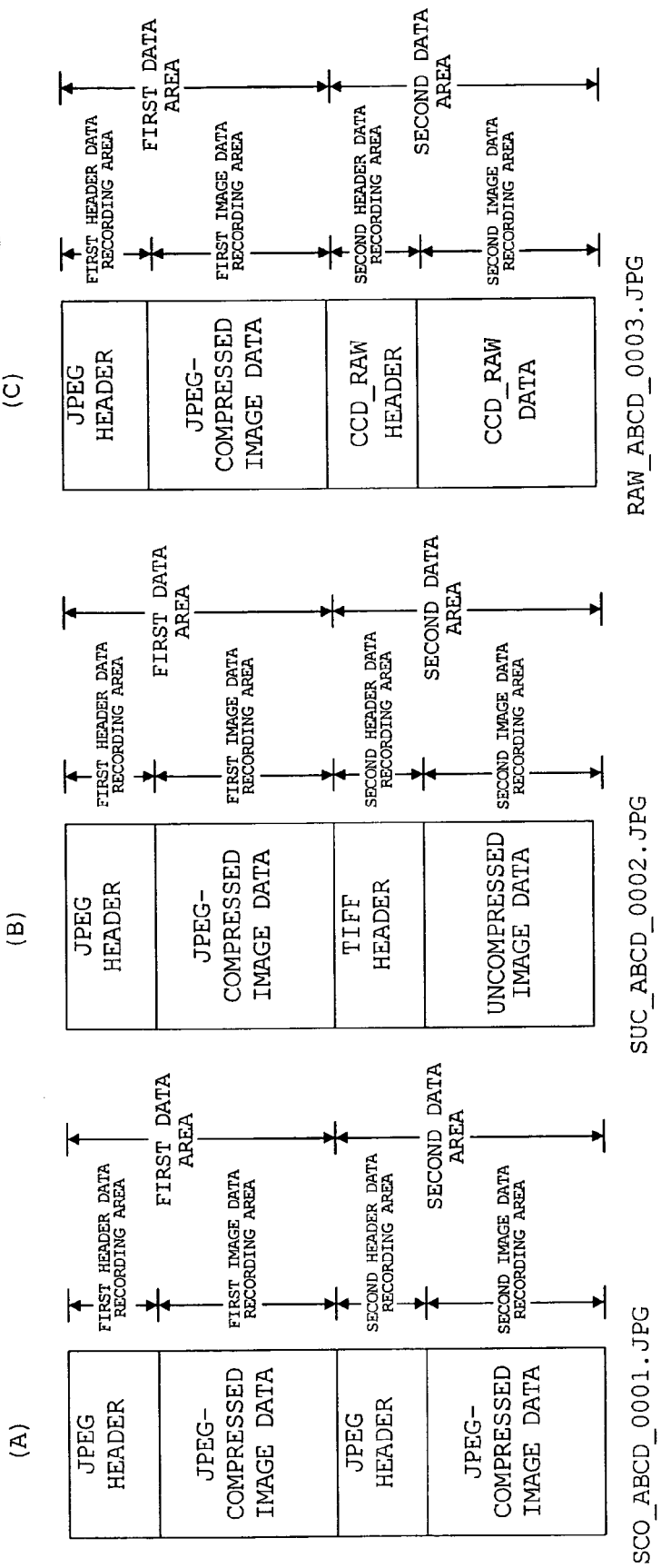
FIGS. 5(A) to (C) illustrate the file structures of image files.

FIG. 5(A) illustrates the file structure of the image file in a case where JPEG-compressed image data is stored as the second image data.

The image file can be divided into a first data area and a second data area, as described above.

JPEG-compressed thumbnail image data is recorded in the first image data recording area, and header data (which also includes the individual characteristics of the second image data) corresponding to the JPEG-compressed thumbnail image data that has been recorded in the first image data recording area is recorded in the first header data recording area. Further, JPEG-compressed image data representing the main image is recorded in the second image data recording area, and header data corresponding to the JPEG-compressed main image data that has been recorded in the second image data recording area is recorded in the second header data recording area.

Furthermore, the file name of the image file is assumed to be "SCM ABCD 0001.JPG". The file name is generated automatically. The extension used conforms to the compression method of the first image data, as mentioned above. Included at the beginning of the file name is a character string (SCO, where S represents a still picture and CO represents the fact that compression has been performed) representing the fact that the second image data is that of a still picture and has been compressed.

With reference again to FIG. 4, if YCC non-compression has been set as the compression mode of the digital still camera (step 31), then YCbCr data on the order of 6,000,000 pixels that has been stored in the memory buffer 10 is read out while being downsampled and YCbCr data representing the main image composed of approximately 3,000,000 pixels is generated (step 36). The generated YCbCr data representing the main image of about 3,000,000 pixels is applied to and stored in the memory buffer 10.

Data for generating the second header data (TIFF: Tagged Image File Format header data) is read from the ROM 9. Header data such as the number of pixels is written additionally by the CPU 6, whereby the second header data is generated, and the second header data is appended to the leading end of the YCbCr data (the second image data), which represents the uncompressed main image of approximately 3,000,000 pixels, that has been stored in the memory buffer 10 (step 37). The YCbCr data represents the uncompressed main image having the second header data appended to its leading end is appended to follow the thumbnail image data having the first header data appended to its leading end (step 38). The resultant data is written to the memory card as a single image file, and the extension used is that (JPG) conforming to the first image data (step 42).

FIG. 5(B) illustrates the file structure of the image file in a case where uncompressed YCbCr image data is stored as the second image data.

In a manner similar to that of FIG. 5(A), JPEG-compressed thumbnail image data is recorded in the first image data recording area, and header data corresponding to the JPEG-compressed thumbnail image data that has been recorded in the first image data recording area is recorded in the first header data recording area. Further, uncompressed YCbCr image data is recorded in the second image data recording area, and header data corresponding to the uncompressed YCbCr image data that has been recorded in the second image data recording area is recorded in the second header data recording area.

Furthermore, the file name of the image file is assumed to be "SUC ABCD 0002.JPG". The extension of the file name used is that corresponding to the compression method of the first image data also in the image file shown in FIG. 5(B). Further, included at the beginning of the file name is a character string (SUC, where S represents a still picture and UC represents the fact that no compression has been performed) representing the fact that the second image data is a still picture and has not been compressed.

With reference again to FIG. 4, if CCD RAW has been set as the compression mode of the digital still camera (step 31), then CCD RAW data on the order of 6,000,000 pixels that has been stored in the memory buffer 10 is read out while being downsampled (step 39) and approximately 3,000,000 pixels of CCD RAW data is generated. The CCD RAW data generated is applied to and stored in the memory buffer 10.

Data for generating the second header data (CCD RAW header data) is read from the ROM 9. Header data such as the number of pixels is written additionally by the CPU 6, whereby the second header data is generated, and the second header data is appended to the leading end of the CCD RAW data (the second image data) that has been stored in the memory buffer 10 (step 40). The CCD RAW data having the second header data appended to its leading end is appended to follow the thumbnail image data having the first header data appended to its leading end (step 41). The resultant data is written to the memory card as a single image file, and the extension used is that (JPG) conforming to the first image data (step 42).

FIG. 5(C) illustrates the file structure of the image file in a case where CCD RAW data is stored as the second image data.

In a manner similar to that of FIG. 5(A), JPEG-compressed thumbnail image data is recorded in the first image data recording area, and header data corresponding to the JPEG-compressed thumbnail image data that has been recorded in the first image data recording area is recorded in the first header data recording area. Further, CCD RAW data is recorded in the second image data recording area, and header data corresponding to the CCD RAW data that has been recorded in the second image data recording area is recorded in the second header data recording area.

Furthermore, the file name of the image file is assumed to be "RAW ABCD 0003.JPG". The extension of the file name used is that corresponding to the compression method of the first image data also in the image file shown in FIG. 5(C). Further, included at the beginning of the file name is a character string (RAW) representing the fact that the second image data is a CCD RAW data.

Thus, the method of compressing the second image data changes depending upon the compression mode to which the digital still camera has been set. The extension of the image file, however, is JPG, which conforms to the first image data recording in the first image data recording area of the first data area. The first data area is similar to the conventional image-file structure, and JPEG compression is a standard compression technique among compression techniques available. This means that reproduction can be achieved by many types of image file reproducing apparatus. Even if the apparatus cannot reproduce the second image data recorded in the image file, it can reproduce the first image data. Though the size of a thumbnail image is fixed in the prior art, the size of the thumbnail image represented by thumbnail image data recorded as the first image data can be decided at will. A thumbnail image having a desired size can be obtained.

FIGS. 6(A), (B), (C) and (D) illustrate file structures of other image files.

FIG. 6(A) illustrates an example of an image file generated in a case where the moving-picture recording mode has been set by the mode changeover dial 8.

JPEG-compressed thumbnail image data is recorded in the first image data recording area, and header data corresponding to the JPEG-compressed thumbnail image data that has been recorded in the first image data recording area is recorded in the first header data recording area. Further, moving-picture data based upon the AVI (Audio Video Interleaved) format is recorded in the second image data recording area, and header data corresponding to the AVI moving-picture data that has been recorded in the second image data recording area is recorded in the second header data recording area.

Furthermore, the file name of the image file is assumed to be "MOV ABCD 0004.JPG". Included at the beginning of the file name is a character string (MOV) representing the fact that the second image data is moving-picture data that is based upon the AVI format.

FIG. 6(B) illustrates an example of an image file generated in a case where the 3D still-picture recording mode has been set by the mode changeover dial 8.

JPEG-compressed thumbnail image data is recorded in the first image data recording area, and header data corresponding to the JPEG-compressed thumbnail image data that has been recorded in the first image data recording area is recorded in the first header data recording area. Further, right-eye image data and left-eye image data for displaying a 3D still picture are recorded in the second image data recording area. Header data corresponding to the right-eye image data and left-eye image data for the 3D still picture that have been recorded in the second image data recording area is recorded in the second header data recording area.

Furthermore, the file name of the image file is assumed to be "3DI ABCD 0004.JPG". Included at the beginning of the file name is a character string (3DI) representing the fact that the second image data is indicative of a 3D image.

In order to obtain the right-eye image data and the left-eye image data, it will suffice to take a picture of the same subject twice from different positions spaced away a prescribed distance away from each other horizontally.

FIG. 6(C) illustrates another example of an image file generated in a case where the 3D still-picture recording mode has been set by the mode changeover dial 8.

JPEG-compressed thumbnail image data is recorded in the first image data recording area, and header data corresponding to the JPEG-compressed thumbnail image data that has been recorded in the first image data recording area is recorded in the first header data recording area. Further, unlike what is shown in FIG. 6(B), a single frame of 3D still-picture image data for displaying a 3D still picture is recorded in the second image data recording area. Header data corresponding to the 3D still picture image data that has been recorded in the second image data recording area is recorded in the second header data recording area.

Furthermore, the file name of the image file is assumed to be "3DI ABCD 0006.JPG". Included at the beginning of the file name is a character string (3DI) representing the fact that the second image data is indicative of a 3D image.

In order to obtain the single frame of image data for a 3D image, it will suffice to execute addressing of the image data, which is stored in the memory buffer 10, so as to obtain an images in which an image of a single acquired frame has been shifted a prescribed distance to the left or right. Image data representing the image obtained by superimposing the right-eye image represented by the right-eye image data obtained by the addressing operation and the left-eye image represented by the left-eye image data obtained by the addressing operation need only be adopted as the second image data.

FIG. 6(D) illustrates another example of an image file generated in a case where the 3D still-picture recording mode has been set by the mode changeover dial 8.

Unlike FIGS. 6(A) to (C), JPEG-compressed right-eye image data for generating a 3D still picture is recorded in the first image data recording area. Header data corresponding to the JPEG-compressed right-eye image data that has been recorded in the first image data recording area is recorded in the first header data recording area. Further, left-eye image data for displaying a 3D still picture is recorded in the second image data recording area. Header data corresponding to the left-eye image data for the 3D still image that has been recorded in the second image data recording area is recorded in the second header data recording area.

Furthermore, the file name of the image file is assumed to be "3DI ABCD 0007.JPG". Included at the beginning of the file name is a character string (3DI) representing the fact that the second image data is indicative of a 3D image.

In all of FIGS. 6(A) to (D), JPEG-compressed image data is recorded in the first image data recording area of the first data area, and the extension of the file name is made JPG in conformity with the image data that has been recorded in the first image data recording area. Even if the image data that has been recorded in the second image data recording area cannot be reproduced, the image data that has been recorded in the first image data recording area can be reproduced.

Figure 7:
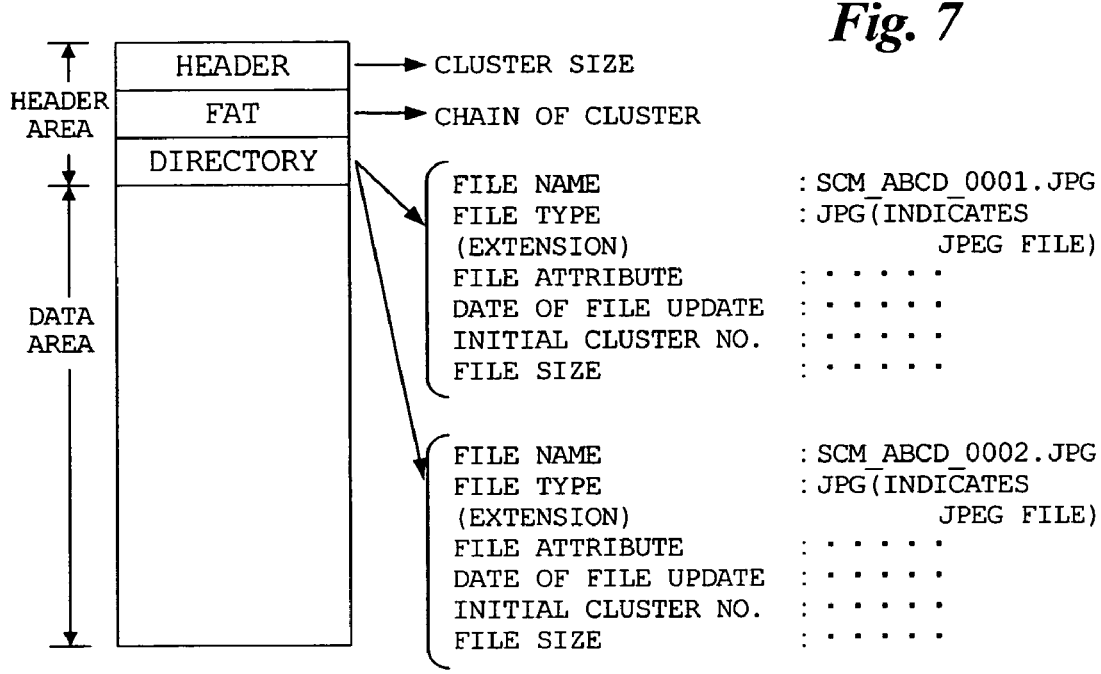
FIG. 7 illustrates the data structure of a memory card.

FIG. 7 illustrates the data structure (file structure) of the memory card 18 (the semiconductor memory inside the memory card). This data structure is in accordance with a DOS-FAT (Disk Operation System-File Allocation Table)-based file system. This DOS-FAT system is included in the PCMCIA (Personal Computer Memory Card International Association) standards and can be read by almost all personal computers.

A file on the memory card 18 is divided into a header area and a data area. The size of the header area is determined in advance. The data area is divided into many clusters. The header area comprises a header, a FAT (File Allocation Table) and a directory. Image files that have been generated in the manner described above are stored in a plurality of clusters.

Cluster size is described in the header. A chain of clusters in which one image file has been stored is described in the FAT. Even if one file has been stored in random clusters, all of the image data can be read out by following the chain of clusters. For every file that has been stored in the data area, the file name, file type (extension), file attribute, date of file update, initial cluster number and file size are stored in the directory.

An extension recorded on the memory card corresponds to the first image data even though first image data and second image data have been placed in one image file, as described above.

It may be so arranged that data indicating the existence and type, etc., of second image data is inserted into an image represented by the first image data in the above-described digital still camera. For example, an on-screen device would be utilized. Since the existence and type, etc., of second image data is displayed on the image represented by the first image data, the existence of the second image data can be ascertained even if the image file is reproduced using an image file reproducing apparatus that cannot reproduce the second image data.

Furthermore, by utilizing as the CPU 6 a CPU having a function for embedding an electronic watermark, it may be so arranged that data indicating the existence and type, etc., of the second image data is embedded in the first image data by an electronic watermark.

Furthermore, in the embodiment described above, all of the image data that is recorded in the first data area of the image file is thumbnail image data obtained by JPEG compression. However, the image data may be image data obtained by compression other than JPEG compression, or data that has not been compressed. In such case, an extension corresponding to compression other than JPEG compression or to non-compression would be appended to the image file.

FIGS. 8 to 12 pertain to reproduction of an image file generated in the manner described above.

Figure 8:
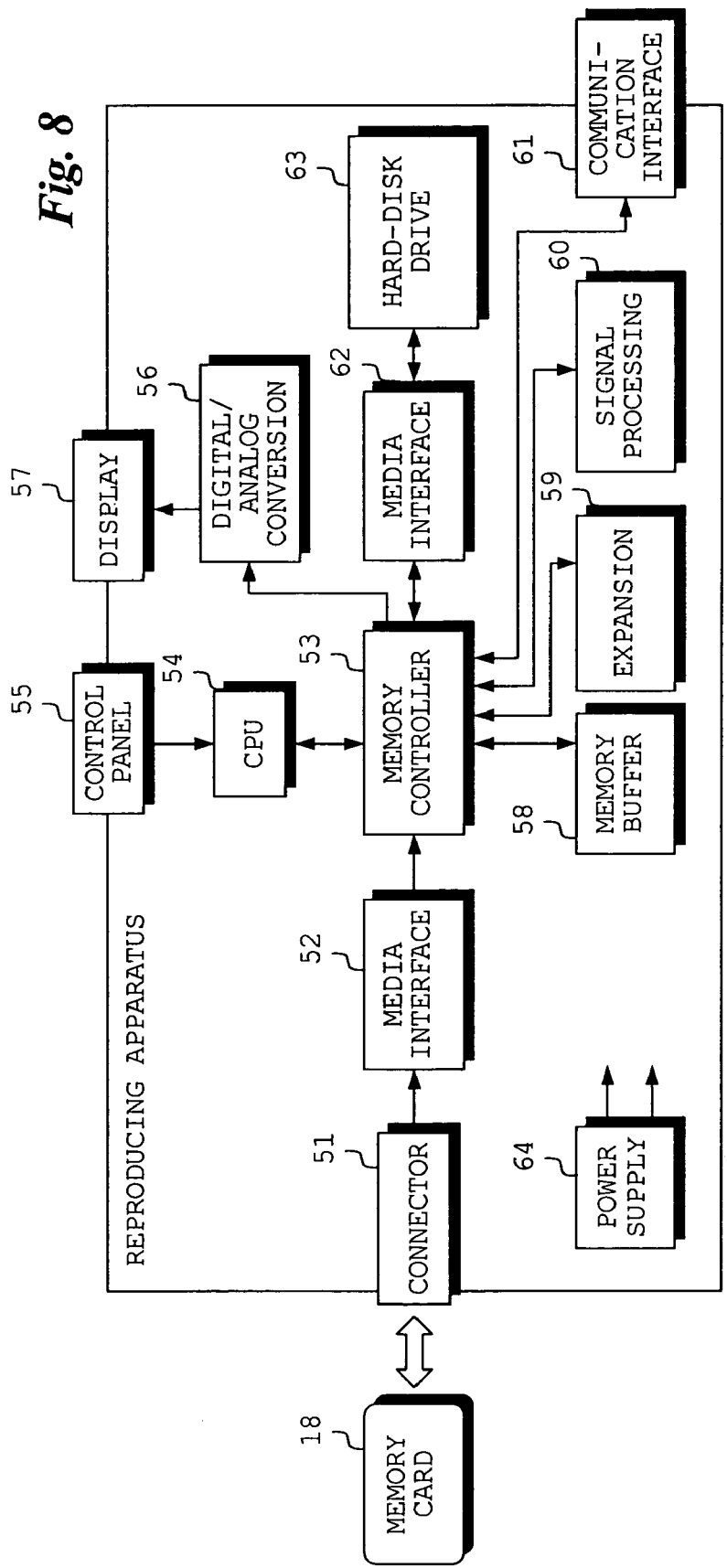
FIG. 8 illustrates the electrical structure of an image file reproducing apparatus.

FIG. 8 is a block diagram illustrating the electrical structure of an image file reproducing apparatus.

The overall operation of the image file reproducing apparatus is controlled by a CPU 54.

A control panel 55 includes a power-supply button, a mode setting dial and a numeric keypad, etc. A control signal from the control panel 55 is input to the CPU 54. The image file reproducing apparatus includes a power-supply circuit 64. The latter supplies various circuits with power.

When the memory card 18 is connected to a connector 51, an image file that has been recorded on the memory card 18 is read and the read image file is applied to a memory controller 53 via a media interface 52. The read image file is applied to and stored temporarily in a memory buffer 58 by the memory controller 53.

If the first image data that has been recorded in the image file read from the memory card 18 has been compressed, then this compressed image data is applied to an expansion circuit 59, which proceeds to expand the image data. If necessary, the expanded first image data is applied to a signal processing circuit 60 and is subjected to predetermined signal processing. The first image data that has undergone signal processing is converted to an analog video signal by applying it to a digital/analog converting circuit 56. The analog video signal obtained by the conversion is applied to a display unit 57, whereby the first image represented by the first image data is displayed. Similarly, the second image data is read from the image file that has been stored temporarily in the memory buffer 58 and the second image, which is represented by this second image data, also is displayed on the display screen of the display unit 57.

The image file reproducing apparatus further includes a communication interface 61. An image file can be transmitted to another apparatus by utilizing the communication interface 61.

The image file reproducing apparatus further includes a hard-disk drive 63. By applying the image file that has been stored temporarily in the memory buffer 58 to the hard-disk drive 63 via a media interface 62, the image file that has been recorded on the memory card 18 can be recorded on a hard disk (not shown).

Figure 9:
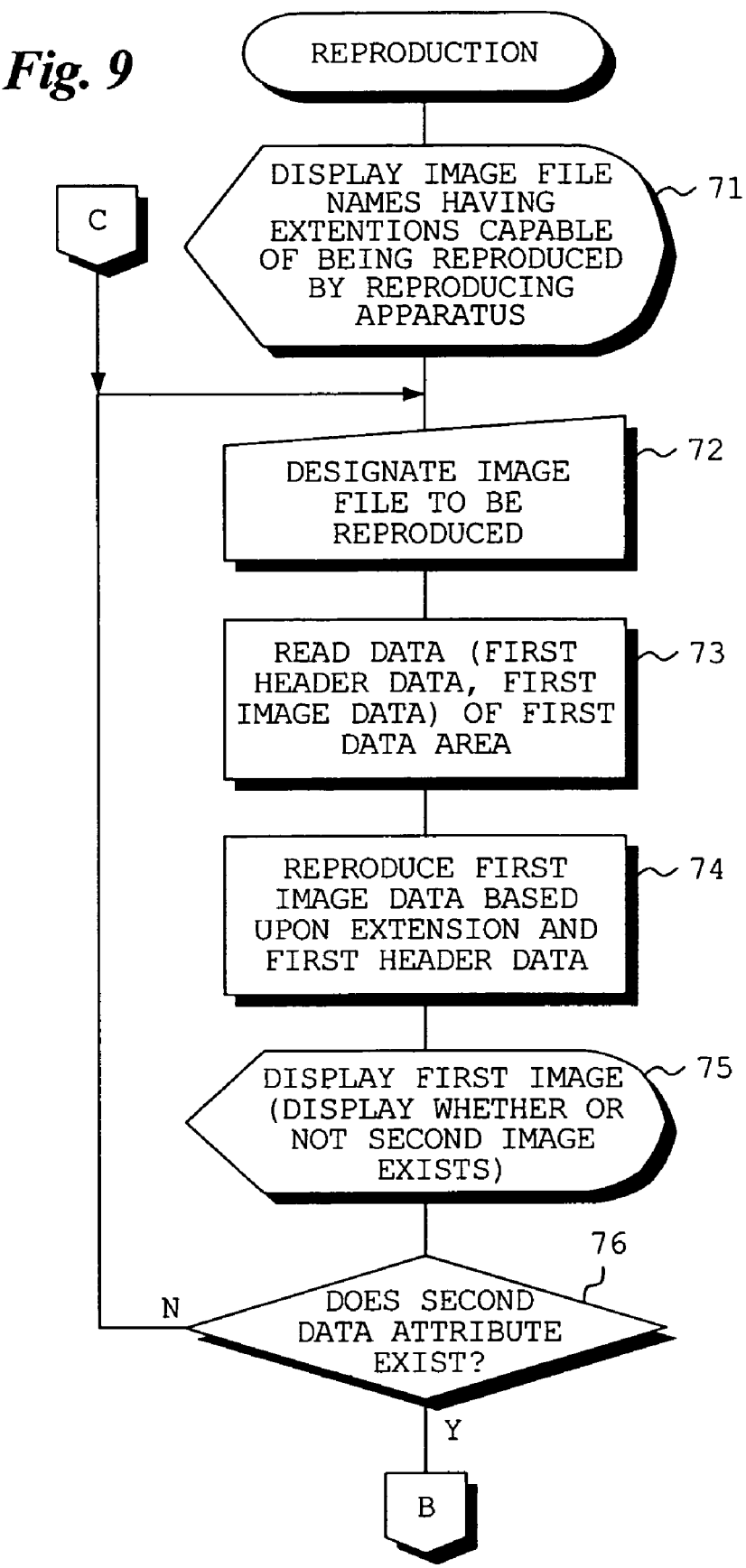
FIG. 9 is a flowchart illustrating reproduction processing.
Figure 10:
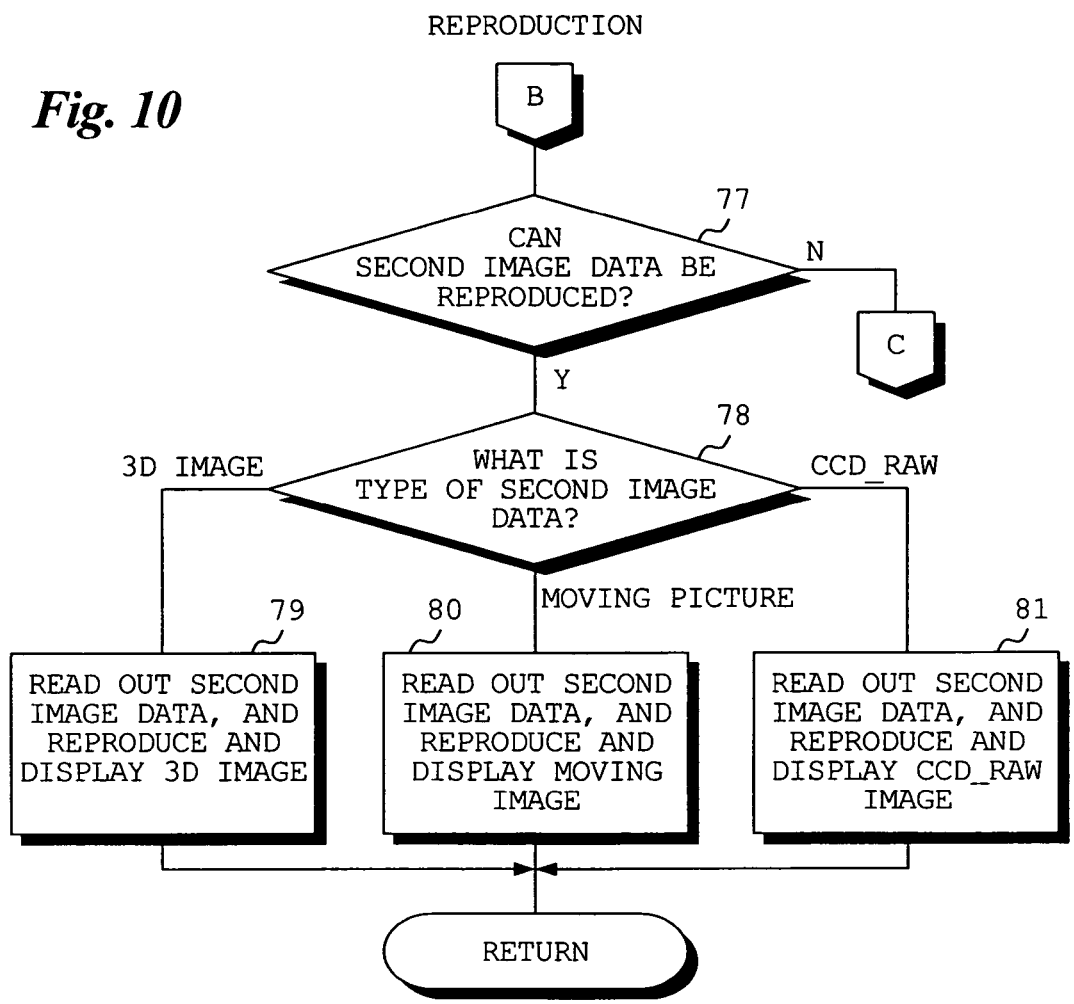
FIG. 10 is a flowchart illustrating reproduction processing.

FIGS. 9 and 10 are flowcharts illustrating reproduction processing executed by the image file reproducing apparatus.

When the memory card 18 is inserted into the image file reproducing apparatus, the file types (extensions) that have been recorded in the header areas on the memory card 18 are read. File names having extensions capable of being reproduced by the image file reproducing apparatus from among the extensions read are displayed in the form of a list on the display screen of the display unit 57 (step 71). The file name of an image file to be reproduced is designated by the user from among the file names displayed in the list (step 72). When this is done, the image file having the designated file name is read from the memory card 18, and the read image file is stored temporarily in the memory buffer 58 in the manner described above. The first header data and the first image data that have been recorded in the first data area of the image file are read (step 73). When this occurs, the first image data is subjected to reproduction processing based upon the first header data and the extension of the image file (step 74). If the first image data is JPEG-compressed image data, then the data is subjected to expansion processing in the expansion circuit 59 based upon the JPEG standard.

The first image data that has undergone signal processing in the signal processing circuit 60 is converted to an analog video signal by the digital/analog converting circuit 56. By applying the analog video signal obtained by the conversion to the display unit 57, the first image represented by the first image data is displayed on the display screen of the display unit 57 (step 75).

If individual characteristics of the second image data and a pointer to the individual characteristics of the second image data, etc., have been recorded in the first header data recording area of the image file ("YES" at step 76), then this means that the second image data has been recorded in the image file read. On the basis of the individual characteristics of the second image data, therefore, it is determined whether the second image data can be reproduced by the image file reproducing apparatus (step 77).

If the second image data can be reproduced ("YES" at step 77), then, after the display of the first image passes a predetermined time, or in response to application of a frame-feed command from the control panel 55, it is determined, based upon the type recorded as the individual characteristics of the second image data, whether the type of second image data is JPEG-compressed 3D image data (right-eye image data and left-eye image data), moving-picture data compressed based upon H.264, or CCD RAW data (step 78). It goes without saying that other types of data may also undergo discrimination.

If the second image data is JPEG-compressed 3D image data, then the 3D image data that is the second image data is read out of the image file and the read data is expanded by the expansion circuit 59. The expanded 3D image data is subjected to 3D still-picture image processing by the signal processing circuit 60. The 3D image data that has undergone the 3D still-picture image processing is applied to the digital/analog converting circuit 56. The 3D still picture is displayed on the display screen of the display unit 57 (step 79).

If the second image data is moving-picture data, then the moving-picture data that is the second image data is read out of the image file, expanded by the expansion circuit 59 and applied to the signal processing circuit 60. The expanded moving-picture data is subjected to moving-picture reproduction processing by the signal processing circuit 60. The moving-picture data that has undergone the moving-picture reproduction processing is applied successively to the digital/analog converting circuit 56, whereby the moving picture represented by the second image data is displayed on the display screen of the display unit 57 (step 80).

If the second image data is CCD RAW data, then the CCD RAW data that is the second image data is read out of the image file and applied to the signal processing circuit 60, where prescribed reproduction processing is executed based upon the CCD RAW data. After being subjected to signal processing in the signal processing circuit 60, the CCD RAW data is applied to the digital/analog converting circuit 56. The analog video signal that is output from the digital/analog converting circuit 56 is applied to the display unit 57, whereby the second image represented by the CCD RAW data is displayed on the display screen of the display unit 57 (step 81).

The above-described reproduction processing pertains to a reproducing apparatus that is capable of reproducing second image data in a case where the second image data having appended header data has been stored in an image file besides first image data having appended header data. However, in a case where an image file in which first image data and second image data are recorded has been read by a conventional reproducing apparatus that is incapable of reproducing the second image data, then the second image data cannot be recognized even if a pointer to the individual characteristics of the second image data contained in the overall characteristics of the first image data has been read. Consequently, only processing for reproducing the first image data is executed and processing for reproducing the second image data is not executed. The first image data is reproduced and compatibility with a conventional image data reproducing apparatus can be maintained.

Further, first header data and first image data can be extracted from an image file containing the first image data having the appended first header data and second image data having appended second header data, and the extracted data can be recorded on a hard disk as a new conventional image file.

Figure 11:
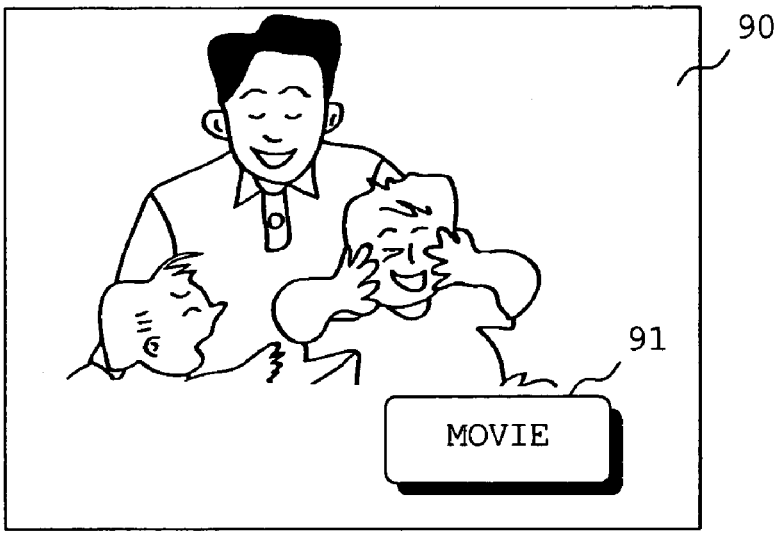
FIG. 11 illustrates an example of a first image.
Figure 12:
FIG. 12 illustrates an example of a first image.

FIGS. 11 and 12 illustrate an example of an image represented by first image data that has been read out of an image file in which both first image data and second image data have been recorded.

In FIG. 11, a first image 90 represented by the first image data is being displayed on the display screen of the display unit 57. Displayed at the lower right of the first image 90 are characters 91 reading "MOVIE", which indicate the fact that second image data has been recorded in an image file identical with that in which the first image data has been recorded, and that the second image data is moving-picture data. The first image 90 in which the characters 91 reading "MOVIE" have been inserted can be displayed by inserting image data, which represents the "MOVIE" characters 91, in the first image data.

Since the characters 91 reading "MOVIE" are displayed, it will be understood that the user is informed of the fact that second image data is present even if the image file reproducing apparatus is one that cannot reproduce the second image data. If necessary, the second image data can be reproduced by using an apparatus that is capable of reproducing the second image data.

In FIG. 12 also, the first image 90 represented by the first image data is being displayed on the display screen of the display unit 57. Here image data representing characters 92 reading "CONTAINS AN IMAGE THAT CAN BE REPRODUCED BY ANOTHER REPRODUCING APPARATUS" has been embedded in the first image data by an electronic watermark.

The first image data is applied to the signal processing circuit 60 and electronic watermark data that has been embedded in the first image data is reproduced, whereby image data representing the characters 92 reading "CONTAINS AN IMAGE THAT CAN BE REPRODUCED BY ANOTHER REPRODUCING APPARATUS" is obtained. The characters 92 represented by the image data obtained are displayed below the first image.

It will be understood that the user is informed of the fact that second image data is present even though the image file reproducing apparatus is one that cannot reproduce the second image data. If necessary, the second image data can be reproduced by using an apparatus that is capable of reproducing the second image data. Since the characters 92 are not inserted in the first image, the user will not be confused by them.

As many apparently widely different embodiments of the present invention can be made without departing from the spirit and scope thereof, it is to be understood that the invention is not limited to the specific embodiments thereof except as defined in the appended claims.

What is claimed is:

1. An image file reproducing apparatus comprising:
    first reading means for reading first image data, first header data and extension data from a recording medium on which have been recorded one image file and the extension data, which corresponds to the first image data and serves as data representing an extension of the image file, wherein the image file includes a first recording area and a second recording area, which have been specified in such a manner that the second recording area follows an end of the first recording, area, each having a header recording area and an image data recording area, respectively, the first header data is recorded in the header recording area of the first recording area, the first image data is recorded in the image data recording area of the first recording area, second header data is recorded in the header recording area of the second recording area and second image data is recorded in the image data recording area of the second recording area, the first image data has a data structure which is independent of a data structure of the second image data, and the second image data includes a format which is different than a format of the first image data;
    first reproducing means for reproducing the first image data, which has been read by said first reading means, based upon the first header data and the extension data;
    first display control means for controlling a display unit so as to display a first image represented by the first image data reproduced by said first reproducing means;
    determination means for determining whether the second header data and the second image data have been recorded in the header recording area and image data recording area, respectively, of the second recording area;
    second reading means, responsive to a determination by said determination means that the second header data and the second image data have been recorded in the header recording area and image data recording area, respectively, of the second recording area, for reading the second header data that has been recorded in the header recording area of the second recording area and the second image data that has been recorded in the image data recording area of the second recording area;
    second reproducing means for reproducing the second image data, which has been read by said second reading means, based upon the second header data; and
    second display control means for controlling the display unit so as to display the second image represented by the second image data reproduced by said second reproducing means.
    wherein one of:
        the second image data comprises a compression format which is different than a compression format of the first image data;
        one of the first and second image data comprises compressed image data and the other of the first and second image data comprises uncompressed image data; and
        one of the first and second image data comprises image data representing a 3D image and the other of the first and second image data comprises image data representing other than a 3D image.

2. An image file generating method comprising:
    generating first header data regarding first image data applied;
    appending generated first header data to a beginning of the first image data;
    generating second header data regarding second image data applied, the second image data including a format which is different than a format of the first image data;
    appending generated second header data to a beginning of the second image data;
    connecting the first image data to which the first header data has been appended and the second image data to which the second header data has been appended by appending the second header data to follow an end of the first image data, the first image data to which the first header data has been appended having a data structure which is independent of a data structure of the second image data to which the second header data has been appended;
    writing the connected data including the first image data to which the first header data has been appended and the second image data to which the second header data has been appended, to a recording medium in such a manner that one image file is generated from the first image data to which the first header data has been appended and the second image data to which the second header data has been appended; and
    recording data, which represents an extension decided based upon the first image data, on the recording medium as data representing an extension of the image file,
    wherein the first header data appending means appends to the first image data at least one of:
        data indicating an address of the second header data in the image file; and
        image-type identification data indicating whether the image represented by the second image data is a moving picture or a still picture and wherein one of:
- the second image data comprises a compression format which is different than a compression format of the first image data;
- one of the first and second image data comprises compressed image data and the other of the first and second image data comprises uncompressed image data; and
- one of the first and second image data comprises image data representing a 3D image and the other of the first and second image data comprises image data representing other than a 3D image.

3. An image file reproducing method comprising:

reading first image data, first header data and extension data from a recording medium on which have been recorded one image file and the extension data, which corresponds to the first image data and serves as data representing an extension of the image file, wherein the image file includes a first recording area and a second recording area, which have been specified in such a manner that the second recording area follows an end of the first recording area, each having a header recording area and an image data recording area, respectively, the first header data is recorded in the header recording area of the first recording area, the first image data is recorded in the image data recording area of the first recording area, second header data is recorded in the header recording area of the second recording area and second image data is recorded in the image data recording area of the second recording area, the first image data has a data structure which is independent of the data structure of the second image data, and the second image data includes a format which is different than a format of the first image data;

reproducing the read first image data based upon the first header data and the red extension data;

displaying a first image, which is represented by the first image data reproduced, on a display unit;

determining whether the second header data and the second image data have been recorded in the header recording area and image data recording area, respectively, of the second recording area;

in response to a determination that the second header data and the second image data have been recorded in the header recording area and image data recording area, respectively, of the second recording area, reading the second header data that has been recorded in the header recording area of the second recording area and the second image data that have been recorded in image data recording area of the second recording area;

reproducing the read second image data based upon the second header data; and displaying a second image, which is represented by the second image data reproduced, on the display unit wherein one of:
- the second image data comprises a compression format which is different than a compression format of the first image data;
- one of the first and second image data comprises compressed image data and the other of the first and second image data comprises uncompressed image data; and
- one of the first and second image data comprises image data representing a 3D image and the other of the first and second image data comprises image data representing other than a 3D image.

4. An image file generating apparatus comprising:
a first header generating device for generating first header data regarding first image data applied thereto;
a first header data appending device for appending first header data, which has been generated by said first header data generating device, to a beginning of the first image data;
a second header generating device for generating second header data regarding second image data applied thereto, the second image data including a format which is different than a format of the first image data;
a second header data appending device for appending second header data, which has been generated by said second header data generating device, to a beginning of the second image data;
a connecting device for connecting the first image data to which the first header data has been appended and the second image data to which the second header data has been appended by appending the second header data to follow the end of the first image data, the first image data to which the first header data has been appended having a data structure which is independent of a data structure of the second image data, to which the second header data has been appended;
an image file writing device for writing the data connected by said connecting device, including the first image data to which the first header data has been appended and the second image data to which the second header data has been appended, to a recording medium in such a manner that one image file is generated from the first image data to which the first header data has been appended and the second image data to which the second header data has been appended; and
an extension recording control device for recording data, which represents an extension decided based upon the first image data, on the recording medium as data representing an extension of the image file,
wherein the first header darn appending means appends to the first image data at least one of:
- data indicating an address of the second header data in the image file; and
- image-type identification data indicating whether the image represented by the second image data is a moving picture or a still picture, and wherein one of:
- the second image data comprises a compression format which is different than a compression format of the first image data;
- one of the first and second image data comprises compressed image data and the other of the first and second image data comprises uncompressed image data; and
- one of the first and second image data comprises image data representing a 3D image and the other of the first and second image data comprises image data representing other than a 3D image.

5. An image file reproducing apparatus comprising:
a first reading device for reading first image data, first header data and extension data from a recording medium on which have been recorded one image file and the extension data, which corresponds to the first image data and serves as data representing an extension of the image file, wherein the image file includes a first recording area and a second recording area, which have been specified in such a manner that the second recording area follows the end of the first recording area, each having a header recording area and an image data recording area, respectively, the first header data is recorded in the header recording area of the first recording area, the first image data is recorded in the image data recording area of the first recording area, second header data is recorded in the header recording area of the second recording area and second image data is recorded in the image data recording area of the second recording area, the first image database a data structure which is independent of a data structure of the second image data, and the second image data includes a format which is different than a format of the first image data;

a first reproducing device for reproducing the first image data, which has been read by said first reading device, based upon the first header data and the extension data;

a first display control device for controlling a display unit so as to display a first image represented by the first image data reproduced by said first reproducing device;

a determination device for determining whether the second header data and the second image data have been recorded in the header recording area and image data recording area, respectively, of the second recording area;

a second reading device, responsive to a determination by said determination device that the second header data and the second image data have been recorded in the header recording area and image data recording area, respectively, of the second recording area, for reading the second header data that has been recorded in the header recording area of the second recording area and the second image data that has been recorded in the image data recording area of the second recording area;

a second reproducing device for reproducing the second image data, which has been read by said second reading device, based upon the second header data; and a second display control device for controlling the display unit so as to display the second image represented by the second image data reproduced by said second reproducing devices wherein one of:
the second image data comprises a compression format which is different than a compression format of the first image data;
one of the first and second image data comprises compressed image data and the other of the first and second image data comprises uncompressed image data; and
one of the first and second image data comprises image data representing a 3D image and the other of the first and second image data comprises image data representing other than a 3D image.

6. An image file generating apparatus comprising:
first header generating means for generating first header data regarding first image data applied thereto;
first header data appending means for appending first header data, which has been generated by said first header data generating means, to a beginning of the first image data;
second header generating means for generating second header data regarding second image data applied thereto, the second image data including a format which is different than a format of the first image data;
second header data appending means for appending second header data, which has been generated by said second header data generating means, to a beginning of the second image data;
connecting means for connecting the first image data to which the first header data has been appended and the second image data to which the second header data has been appended by appending the second header data to follow an end of the first image data, the first image data to which the first header data has been appended having a data structure which is independent of a data structure of the second image data to which the second header data has been appended;

image file writing means for writing the data connected by said connecting means, including the first image data to which the first header data has been appended and the second image data to which the second header data has been appended, to a recording medium in such a manner that one image file is generated from the first image data to which the first header data has been appended and the second image data to which the second header data has been appended; and extension recording control means for recording data, which represents an extension decided based upon the first image data, on the recording medium as data representing an extension of the image file, wherein the first header data appending means appends to the first image data at least one of:
data indicating an address of the second header data in the image file; and
image-type identification data indicating whether the image represented by the second image data is a moving picture or a still picture, and wherein one of:
the second image data comprises a compression format which is different than a compression format of the first image data;
one of the first and second image data comprises compressed image data and the other of the first and second image data comprises uncompressed image data; and
one of the first and second image data comprises image data representing a 3D image and the other of the first and second image data comprises image data representing other than a 3D image.

7. An image file generating apparatus comprising:
first header generating means for generating first header data regarding first image data applied thereto;
first header data appending means for appending first header data, which has been generated by said first header data generating means, to a beginning of the first image data;
second header generating means for generating second header data regarding second image data applied thereto, the second image data including a format which is different than a format of the first image data;
second header data appending means for appending second header data, which has been generated by said second header data generating means, to a beginning of the second image data;
connecting means for connecting the first image data to which the first header data has been appended and the second image data to which the second header data has been appended by appending the second header data to follow an end of the first image data, the first image data to which the first header data has been appended having a data structure which is independent of a data structure of the second image data to which the second header data has been appended;
image file writing means for writing the data connected by said connecting means, including the first image data to which the first header data has been appended and the second image data to which the second header data has been appended, to a recording medium in such a manner that one image file is generated from the first image data to which the first header data has been appended and the second image data to which the second header data has been appended; and extension recording control means for recording data, which represents an extension decided based upon the first image data, and the recording medium as data representing an extension of the image file, wherein the first header data appending means appends to the first image data at least one of:

data indicating an address of the second header data in the image file; and image-type identification data indicating whether the image represented by the second image data is a moving picture or a still picture, and wherein the apparatus further comprises:

mode determining means for determining a compression/non-compression mode of the image file generating apparatus after the first header data appending means appends the first header data to the first image data.

8. The apparatus according to claim 7, further comprising:

a buffer memory; and image data generating means which generates the second image data based on the determined mode and stores the second image data in the buffer memory.

9. The apparatus according to claim 8, wherein after the second image data is stored in the buffer memory, the second header generating means generates the second header data and the second header data appending means appends the second header data to the second image data stored in the buffer memory.

* * * * *